(12) United States Patent
Liu et al.

(10) Patent No.: US 8,478,233 B2
(45) Date of Patent: Jul. 2, 2013

(54) MOBILE COMPUTING DEVICE APPLICATION NETWORK USE METRIC AND MONETARY COST MONITOR AND CONTROL

(75) Inventors: Bojin Liu, Davis, CA (US); Behrooz Khorashadi, Mountian View, CA (US); Saumitra M. Das, San Jose, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 49 days.

(21) Appl. No.: 13/195,598

(22) Filed: Aug. 1, 2011

(65) Prior Publication Data

US 2013/0035059 A1 Feb. 7, 2013

(51) Int. Cl.
*H04M 11/00* (2006.01)
(52) U.S. Cl.
USPC .......................................... 455/406; 455/405

(58) Field of Classification Search
USPC .......... 455/405–408, 410–411, 414.1–414.3, 455/418–420; 715/733–736; 709/223–226; 726/1–21; 719/223–226, 328, 329
See application file for complete search history.

(56) References Cited

U.S. PATENT DOCUMENTS

| | | | | |
|---|---|---|---|---|
| 6,101,607 | A * | 8/2000 | Bachand et al. | 726/17 |
| 2011/0047594 | A1* | 2/2011 | Mahaffey et al. | 726/1 |
| 2011/0086610 | A1* | 4/2011 | Baldwin et al. | 455/405 |
| 2012/0054661 | A1* | 3/2012 | Rados et al. | 715/772 |
| 2012/0110174 | A1* | 5/2012 | Wootton et al. | 709/224 |
| 2012/0117478 | A1* | 5/2012 | Vadde et al. | 715/736 |

* cited by examiner

*Primary Examiner* — Kashif Siddiqui
(74) *Attorney, Agent, or Firm* — Neugeboren O'Dowd PC (57) ABSTRACT

A mobile computing device comprising an application network use metric monitoring agent providing a network use metric usage for one or more mobile computing device applications and a network plan interface, wherein, a monetary cost is associated with the network use metric usage for the one or more mobile computing device applications.

21 Claims, 4 Drawing Sheets

MOBILE COMPUTING DEVICE APPLICATION NETWORK USE METRIC AND MONETARY COST MONITOR AND CONTROL

FIELD OF THE INVENTION

The present invention relates to operating mobile computing device applications. In particular, but not by way of limitation, the present invention relates to monitoring and controlling a network use metric usage and monetary cost of one or more mobile computing device applications.

BACKGROUND OF THE INVENTION

The number of mobile computing device applications which require access to the internet is increasing. Internet access is typically provided through a cellular network such as, but not limited to, a 3G or a 4G network, or through a WiFi connection. However, not all network carriers providing cellular service to mobile computing devices include unlimited data access, and not all WiFi connections are free and such WiFi connections may be difficult to find. For example, some network carriers may place a monthly data use cap on a device, while some network plans may comprise a prepaid plan—i.e., 200 MB for $35.

Many current mobile computing device applications are agnostic to which network the application may use, or which application features may be implemented across certain networks. Such applications simply choose whatever network interface is available and use the interface without concern for the amount of bandwidth or other network use metric the application is using on the network. Furthermore, users are not provided with easily-accessible mechanisms to determine the bandwidth used by each application and application features. Users may be unaware that an application may be using network resources without any instruction to do so from the user—i.e., in the background of the mobile computing device.

SUMMARY OF THE INVENTION

It would often be advantageous for the mobile computing device applications to operate in one or more modes, depending on the type network available and the network carrier plan that is servicing the mobile computing device. For example, if the mobile computing device is connected to a free network providing the mobile computing device unlimited data access, each feature of the mobile computing device applications may operate to its full potential. However, when the mobile computing device is connected to a bandwidth limited network or a network that may charge for data use across the network, certain features of the mobile computing device may cease to operate, or may operate in a scaled-down mode. Disclosed herein are embodiments of an invention pertaining to monitoring and controlling the data used by a mobile computing device and mobile computing device applications. Such embodiments enable the user to control which applications and application features may access which data networks, depending on the network data plan, and the available data bytes in the data plan and the remaining time in the data plan billing cycle.

One embodiment of the invention comprises a mobile computing device having an application network use metric monitoring agent. This monitoring agent provides a network use metric used by one or more mobile computing device applications. The mobile computing device further comprises a network plan interface. This is a mechanism which allows a monetary cost to be associated to the network use metric used by the one or more mobile computing device applications. Such a cost is dependent upon what the mobile computing device is charged for the data used by the network carrier through the agreement, or network plan, servicing the mobile computing device.

Another embodiment of the invention comprises a mobile computing system comprising an agent, a user interface, a service, a first application programming interface, a second application programming interface, and one or more mobile computing device applications, wherein the one or more mobile computing device applications comprise a first application, a second application, and a third application. The agent is adapted to monitor network stack traffic associated with one or more mobile computing device applications. The user interface is adapted to display at least one of a monetary cost and a network use metric associated with one or more features of one or more mobile computing device applications and is further adapted to at least one of enable and disable the one or more features on the one or more mobile computing device applications. The service is adapted to run on the mobile computing device and implement the at least one of enabling and disabling one or more features on the one or more mobile computing device applications. The first application programming interface is adapted to at least one of enable and disable one or more features on the first application, wherein the first application being registered with the first application programming interface. The second application programming interface is adapted to provide at least one response to at least one query from the second application, with the second application adapted to at least one of enable and disable one or more features of the second application upon receiving the at least one response. The third application comprises one or more features that are adapted to be at least one of manually enabled and disabled according to at least one of a monetary cost and a network use metric associated with the one or more features.

And another embodiment of the invention may be characterized as a method of controlling one or more mobile computing device applications. One method comprises monitoring a bandwidth used by the one or more mobile computing device applications, calculating a monetary cost for the bandwidth used by the one or more mobile computing device applications, and adjusting the bandwidth used by the one or more mobile computing device applications.

Yet another embodiment of the invention may be characterized as a non-transitory, tangible computer readable storage medium on a mobile computing device, encoded with processor readable instructions to perform a method of adjusting a monetary cost of one or more features on one or more mobile computing device applications. The method of adjusting a monetary cost of one or more features on one or more mobile computing device applications comprises monitoring a network use metric used by the one or more mobile computing device applications, calculating a monetary cost for the network use metric used by the one or more mobile computing device applications, and using at least one of the network use metric and the monetary cost to adjust the network use metric used by the one or more features on the one or more mobile computing device applications.

BRIEF DESCRIPTION OF THE DRAWINGS

Various objects and advantages and a more complete understanding of the present invention are apparent and more readily appreciated by reference to the following Detailed Description and to the appended claims when taken in con

DETAILED DESCRIPTION

Figure 1:
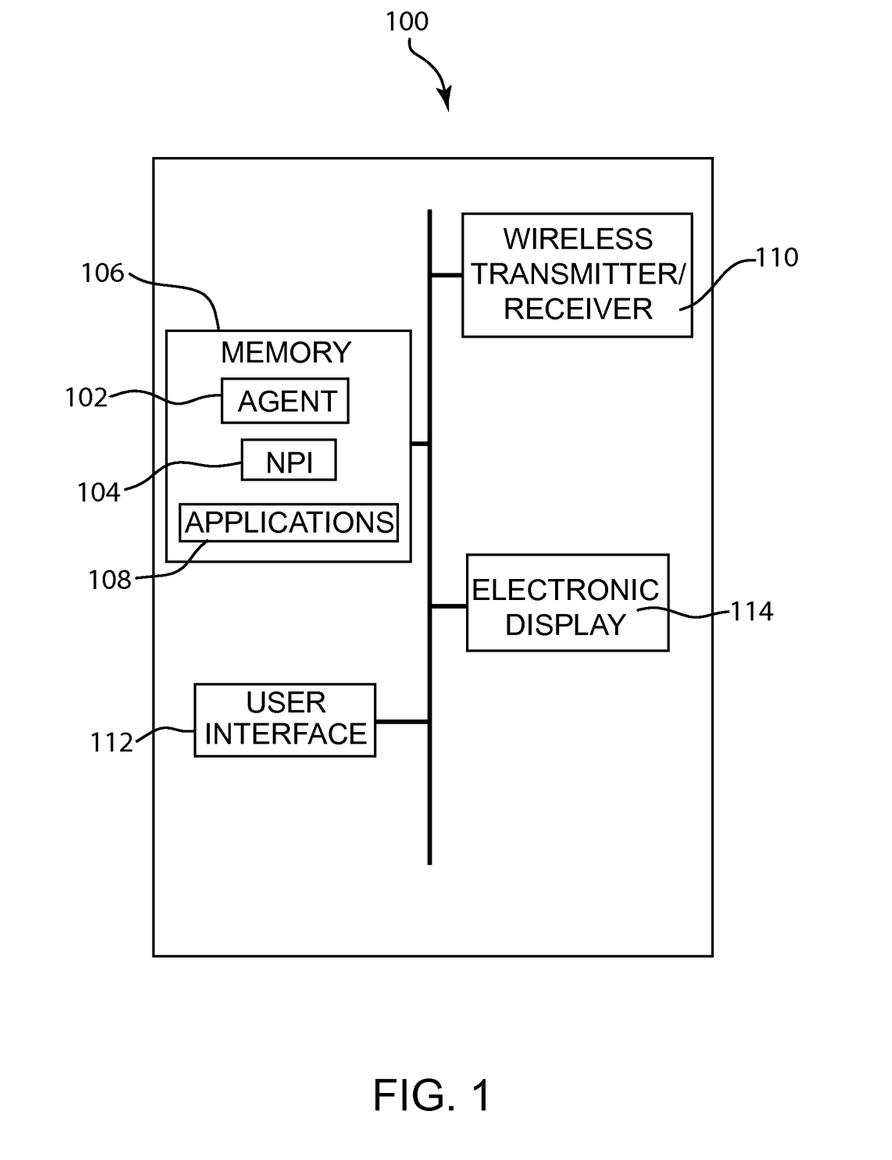
- FIG. 1 illustrates a block diagram depicting physical components of an exemplary embodiment of the present invention.

Referring first to FIG. 1, seen is a mobile computing device 100. One mobile computing device 100 comprises an application network use metric monitoring agent 102 and a network plan interface, or NPI, 104. The application network use metric monitoring agent 102 may be referred to throughout the application as an agent 102, where appropriate. The agent 102 and NPI 104 may both comprise one or more of software and hardware. As seen in FIG. 1, the agent 102 and NPI may comprise a portion of a mobile computing device memory 106.

The agent 102 in one embodiment is adapted to monitor the amount of bandwidth (i.e., bytes over time) used by one or more applications 108. Alternatively, the agent 102 may monitor another network use metric such as, but not limited to, an aggregate amount of data used or packets sent/received to/from the network. Therefore, although the term "bandwidth" may be used throughout the application to describe the network use metric, it is contemplated that one or more alternative network use metrics may be substituted for the term "bandwidth". In one example, the one or more applications 108 may communicate with a mobile computing device wireless transmitter/receiver 110—sending and receiving information through the wireless transmitter/receiver 110 across a network. The agent 102 may monitor the network used by the one or more applications 108 and determine a bandwidth that each of the one or more applications 108 is using at any particular time. In one embodiment, the agent 102 may determine (i) the bandwidth used for a given time period, (ii) when the bandwidth changes, (iii) what value the bandwidth changes to, and (iv) when the bandwidth reaches zero for each application. Other options known in the art are also contemplated. The agent may also determine the bandwidth used by individual features of a single application. In one embodiment, the information may be saved to a log file.

The network plan interface 104 may be adapted to apply a monetary cost to the bandwidth used by the one or more mobile computing device applications 108. For example, the NPI 104 may comprise information detailing a network plan that a mobile computing device user has with a network carrier and is associated with the mobile computing device 100. It is also contemplated that the NPI 104 may communicate through the wireless transmitter/receiver 110 across the network with a server such as, but not limited to, a network carrier server, to receive information regarding the cost of the bandwidth used.

Figure 2:
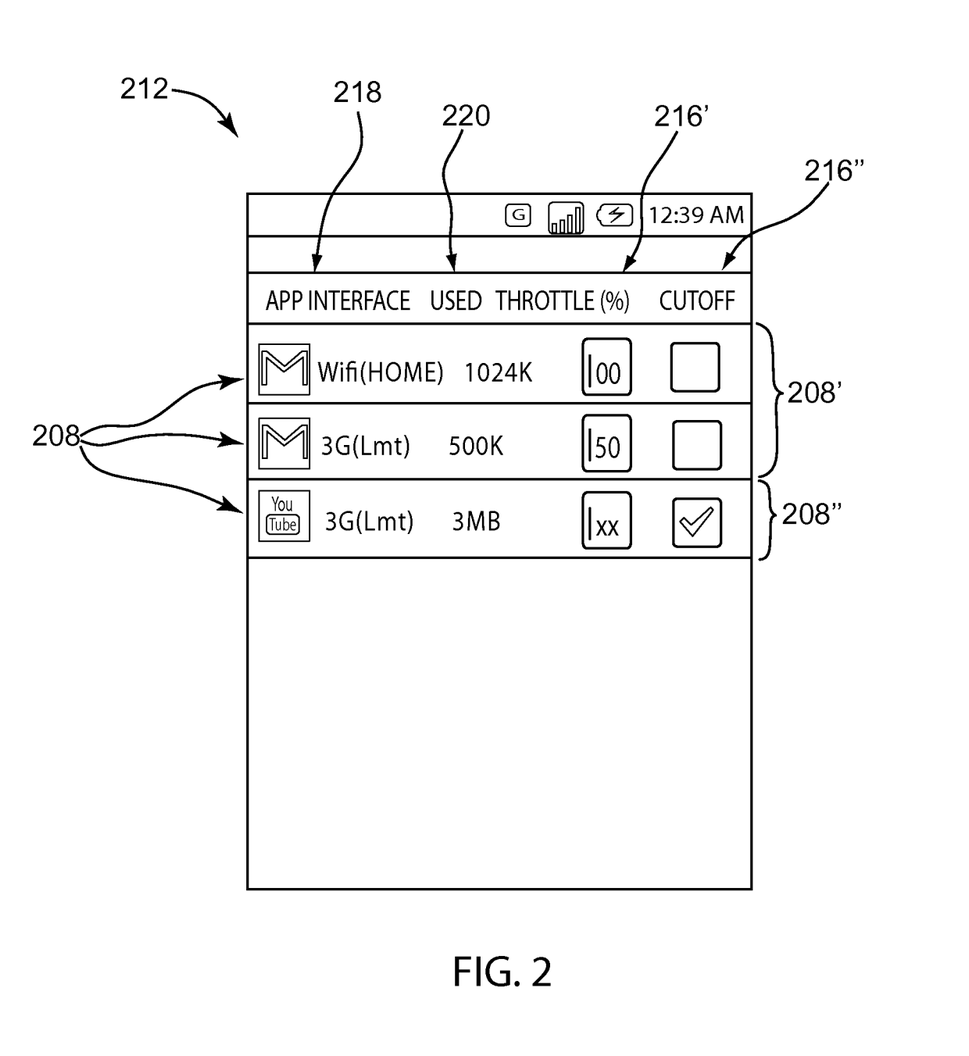
FIG. 2 illustrates a representation of a user interface of an exemplary embodiment of the invention.

One mobile computing device 100 may further comprise a user-interface 112. In one embodiment the user-interface 112 may display the bandwidth used and/or monetary cost for the one or more mobile computing device applications 108 on an electronic display 114. As seen in FIG. 2, the user-interface 212 may provide a list of the one or more applications 208 and may also provide one or more bandwidth adjustment settings 216 for the one or more mobile computing device applications 208. The applications 208 displayed in the user-interfaces 212 may comprise applications 208 currently using bandwidth on the mobile computing device 100. However, applications 208 may also be listed which are not correctly using bandwidth. Also listed in the user interface 212 may be a network interface 218 for each of the one or more applications 208, as well as the total amount of bandwidth used 220 for each application on that network interface. The total bandwidth used 220 may be for a single session (i.e. a given time period). Other settings 216 and display categories are also contemplated besides the settings 216 and display categories (e.g., interface 218, bandwidth used 220) seen in FIG. 2. In one embodiment, the one or more settings 216 may comprise one or more network settings. For example, a user may be able to adjust or "throttle" the amount of bandwidth that is allocated to each application 208, as well as restrict the application from using any bandwidth—i.e., cutting-off the application 208 from the network. In one embodiment, a user may set a "throttle" value to zero if the user does not wish to limit the bandwidth used by the application 208. Values may range from zero to 100, with each higher value comprising less bandwidth in one embodiment. However, a higher number may comprise more bandwidth in an embodiment as well.

It is contemplated that one of the one or more applications 208 may comprise a first application. The functionality of the first application 208, with respect to the amount of bandwidth used by the first application, may be automatically adjusted by the first application, dependent upon an amount of bandwidth remaining in the data plan servicing the mobile computing device 100, as well as the network that the mobile computing device 100 is connected to. For example, if the mobile computing device 100 is connected to a 3G network, and the network data plan providing the mobile computing device 100 access to the 3G network has a data-cap, the user-interface 212 may be used so that the first application may be set so that certain functionality of features of the first application 208 may not operate or may operate at a decreased level when a percentage (such as, but not limited to, 50%) of the datacap is reached. In one embodiment, various features of the application may only be fully operational when the mobile computing device 100 is connected to a free network, such as, but not limited to, a WiFi network. Seen in FIG. 2 is a first application 208' comprising an email application. In one embodiment, the user interface 212 may be used to only allow the first application 208' to use 50% of a 3G network capacity. In other embodiments (not shown), features of a first application 208', such as, but not limited to, disabling a download of attachments, is also contemplated, where the features may be disabled/enabled on a network-by-network basis. Such information, among others, may be supplied by the agent 102 and NPI 104. Furthermore, it is contemplated that such application settings 216 may be adjusted through the user interface 212. For example—one embodiment comprises a second application whose functionality is adjusted through the user interface 212.

In one embodiment, the one or more mobile computing device applications 208 may comprise one of the first application 208' and a second application 208". In such an embodiment, and in other embodiments, the network plan interface 104, as seen, for example, in FIG. 1, may determine that the mobile computing device 100 is connected to a free network. For example, the free network may comprise a network that does not charge a network plan servicing the mobile computing device 100, and may comprise a home WiFi network. In such a free network embodiment, as well as in other embodiments where the user or the agent 302 has identified the application to receive data, the background agent 322 may enable data to be sent to the one of the application 308. One such application may comprise an email application that may only operate upon connection to the home WiFi network.

Figure 3:
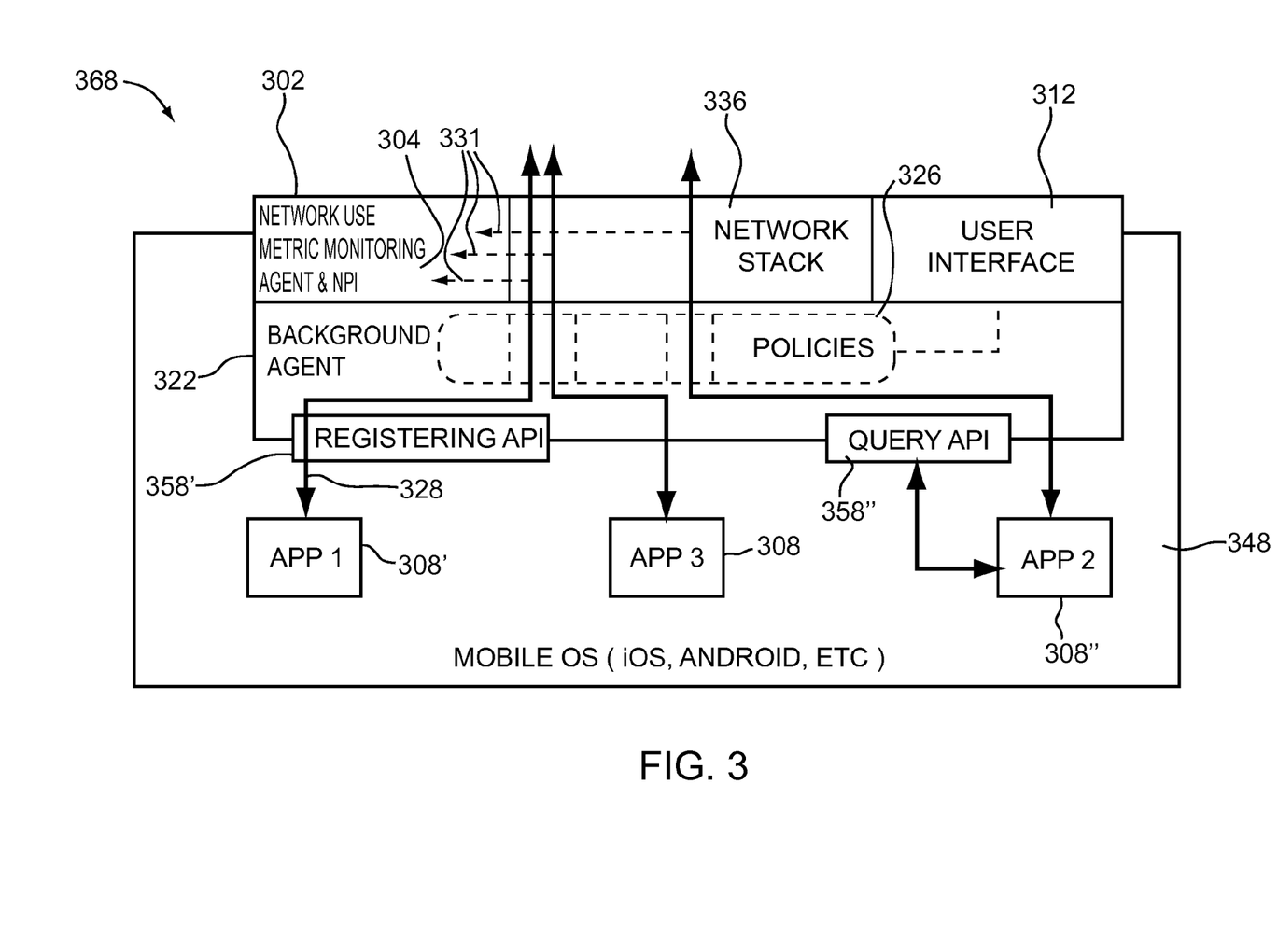
FIG. 3 illustrates a representation of a mobile computing system of an exemplary embodiment of the invention.

The mobile computing device 100 may further comprise a background agent adapted to enforce the settings 216 as established in the user interface 212 for each application 208 and application feature. For example, seen in FIG. 3 is one background agent 322. The background agent 322 seen in FIG. 3 may be adapted to run as a background process in a mobile computing device operating system 348 and may be initiated upon powering on of the mobile computing device 100. One background agent 322 may analyze all incoming and outgoing network traffic and enforce the policies as established by the settings 216 through the bandwidth monitoring agent 302 and the NPI 304 for the one or more mobile computing device applications 308.

Seen in FIG. 3 is one first application 308' and a network traffic 328 associated with the first application 308'. Upon enforcing policies 326 associated with the first application 308' as established either by the settings 216 in the user interface 212 or through an automatic implementation of setting 216, the background agent 322 will either allow data to be sent to/from the first application 308' through the network stack 336, or it will deny the transfer of data either to the first application 308' or from the first application 308'. The bandwidth monitoring agent 302 and the NPI 304 may receive the necessary information to operate both processes from the network stack 336, as evidenced by the dashed arrows 331 from the network traffic 328 associated with each application 308. Therefore, as seen in FIG. 3, the background agent 322 operates to prevent data from being transferred to/from the network stack 336, upon receiving the application settings from the agent 302 and the NPI 304. The background agent 322, bandwidth management agent 302, and NPI 304 may be in communication with each other in order for proper operation to occur.

Returning to FIG. 2, in one embodiment, the one or more network settings 216 comprise one or more first settings 216' and one or more second settings 216". The one or more first settings 216' may comprise the throttle setting. In one embodiment, the first setting 216' is provided for each application 208 on each interface 218. One interface 218 comprises the network type. For example, one interface may comprise a WiFi connection and another interface may comprise a 3G connection. The first setting 216' may adjusts the bandwidth used by the application 208 on that particular interface 218. In one embodiment, the first setting 216' may comprise a percentage of the available bandwidth. For example, seen in FIG. 2, a "50" is entered for one application 208 accessing a 3G interface 218. Therefore, this application 208 would only be able to access 50% of the available bandwidth at any given moment. The second setting 216" in one embodiment is a "cutoff" setting which may enable and disable the application 208 from accessing the interface 218.

One user interface 212 may comprise a bandwidth limit. A bandwidth limit of one mobile computing device 100 may comprise a percentage of the available bandwidth in a network plan. For example, if a network plan provides a user with 6 MB of data per month, one network setting 216 may establish that an application 208 is disable upon reaching a percentage of that available monthly bandwidth. For example, in FIG. 2 is a second application 208" comprising a YouTube® application. Such an application may be automatically set to "cutoff" in the second setting 216" upon reaching the bandwidth limit.

The one or more network settings 216 may be adapted to enable and disable one or more individual features of the one or more mobile computing device applications, the one or more features being enabled and disabled dependent upon an available bandwidth. For example, attachments may be disabled in the first application 208' upon reaching a 50% limit of the available bandwidth in a monthly network plan. The ability to enable and disable application features may be set through an application programming interface (API) 348. In one embodiment, the application programming interface 348 is adapted to at least one of register the enabling and disabling of the one or more features of the applications 308 with the bandwidth monitoring agent 302. In one embodiment, the API 348 may also be adapted provide a response to a query from the applications 308. For example, the application may query the NPI 304 or other feature of the mobile computing device 100 to determine the amount of bandwidth remaining in a network plan, and dependent upon the response from the NPI 304, the application 308 may enable or disable features of the application, or the entire application 308 itself.

FIG. 3 in one embodiment comprises a mobile computing system 368. One mobile computing system 368 may comprise an operating system. Additionally, the mobile computing system may comprise a background agent 322 monitoring network stack 336 traffic associated with one or more mobile computing device applications 308. The mobile computing system 368 further comprises the user interface 312 which, in at least one embodiment, is adapted to at least one of enable and disable one or more features on the one or more applications 308. The application features may enabled and disabled dependent upon at least one of a monetary cost and a bandwidth cost associated with the one or more features. As seen, the mobile computing system 368 further comprises a service implementing the enabling and disabling of the one or more features on the one or more mobile computing device applications. One service may comprise the background agent 322.

One mobile computing system 368 may further comprise a first application programming interface 358' and a second application programming interface 358". The first application programming interface 358' may be adapted to at least one of enable and disable one or more features on a first application 308'. For example, the first application 308' may be registered with the first application programming interface 358' in order for the features to be enabled/disabled. The second application programming interface 358" may be adapted to provide responses to queries from a second application 308", with the second application 308" at least one of enabling and disabling one or more features of the second application upon receiving the at least one response. Each application programming interface 358 may be adapted to communicate with the background agent 332 and/or the bandwidth monitoring agent 302 and/or the NPI 304 in order for the operation of the applications 308 to be modified properly. One mobile computing system 368 may also include a third application 308'''. One third application 308''' may comprise one or more features that may be manually enabled and disabled according to at least one of a monetary cost and a bandwidth usage of the one or more features. For example, as see in FIG. 3, the third application 308''' does not interface with an API 358, but communicates directly with a background agent 322 and/or a bandwidth monitoring agent 302 and/or a NPI 304.

In one mobile computing system 368, the user interface 312 may comprise the first setting 216' and second setting 216". The first setting enables a percentage of available bandwidth to be used by the first application 308', second application 308", and third application 308'''. The second setting 216" may disables at least one of the first application 308', second application 308", and third application 308"', for example, upon a bandwidth level reached, as determined by the NPI 304. It is contemplated that one application 308 may comprise an email application, and features on the email application may comprise a sync feature and an attachment download feature. An application programming interface 358 may limit the sync feature to a first bandwidth and the first application programming interface may limit the attachment download feature to a second bandwidth. For example, the sync feature (or any other feature or any other application) may only operate when the bandwidth servicing the mobile computing device 100 is greater than 100 kbps or when the total bandwidth limit remaining is greater than 50%, or when the mobile computing device is connected to a specific network type (i.e., interface).

The applications 308 may query or otherwise communicate with one or more APIs 358 for information such as, but not limited to, network data plan information, or the information may be provided directly to the application 308. In response to the network data plan information, a first application 308' may implement a first operation and a second application 308" may implement a second operation, where the first operation comprises a greater bandwidth usage than the second operation. The network data plan information may comprise an amount of data bytes remaining in a data plan associated with the mobile computing device 100, an end time of a current billing period associated with the data plan, and/or how much time remains to a new billing cycle initiating, and therefore a resetting of the available bandwidth occurring.

Figure 4:
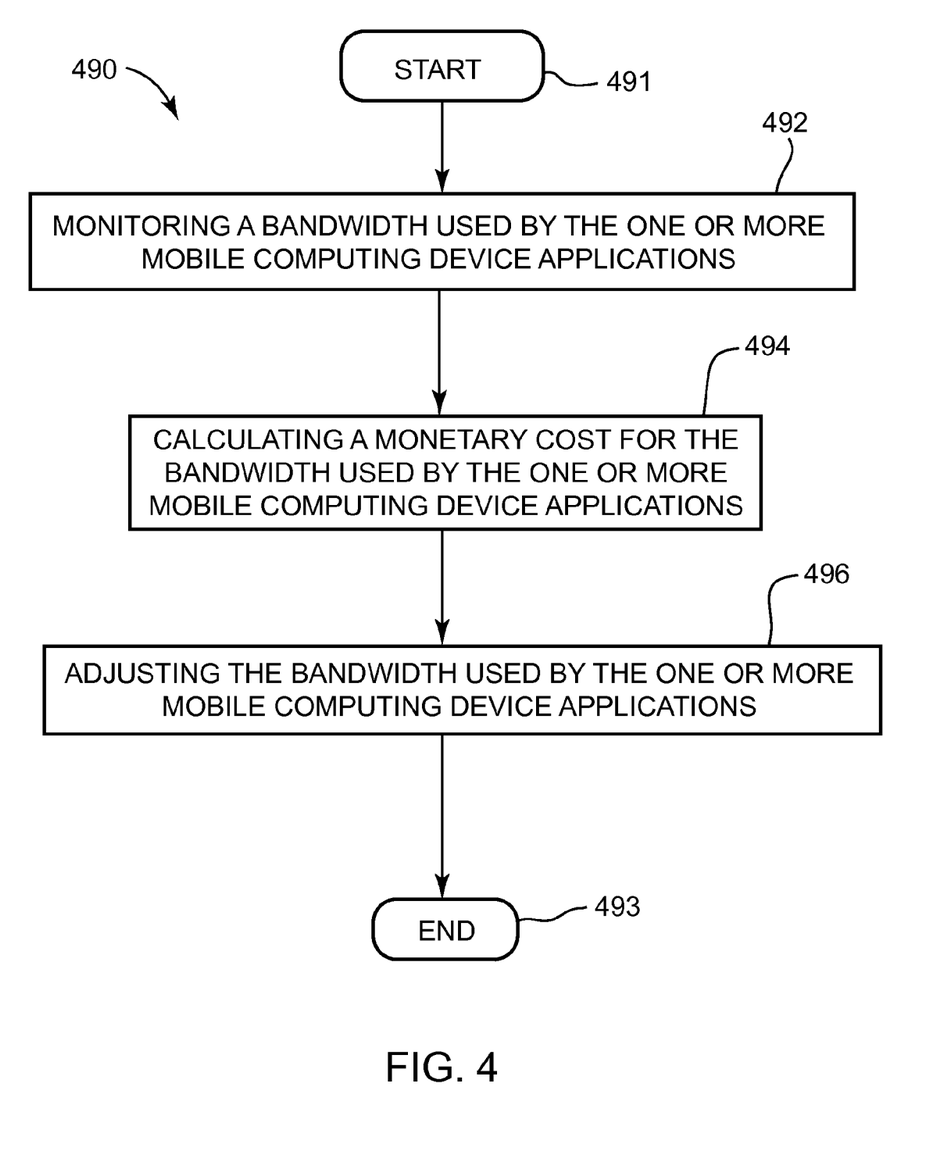
FIG. 4 is a flowchart that depicts a method that may be carried out in connection with the embodiments described herein.

Turning now to FIG. 4 seen is one method of controlling one or more mobile computing device applications 308. The method starts at 491 and at 492 the method of FIG. 4 comprises monitoring a bandwidth used by the one or more mobile computing device applications 308. At 494 the method comprises calculating a monetary cost for the bandwidth used by the one or more mobile computing device applications 494. At 496 the method comprises adjusting the bandwidth used by the one or more mobile computing device applications 308. The method ends at 493.

Adjusting the bandwidth used by the one or more mobile computing device applications 308 may comprise using a user interface 312 to display and adjust at least one of the bandwidth used by, and the monetary cost of, one or more features of the applications 308. It is also contemplated that individual application features may not be displayed and only an application 308 may be displayed in the user interface 312. Adjusting at least one of the bandwidth used and the monetary cost of at least one feature of the one or more mobile computing device applications 308 may comprise at least one of, (i) allowing the at least one application feature to access one of a free network and an unlimited bandwidth network, (ii) allowing the at least one feature to access one of a cost-incurring network and a limited bandwidth network until a data threshold is obtained, and (iii) providing a percentage of a total available bandwidth to the at least one feature in one or more types of networks. Adjusting the bandwidth used by the one or more mobile computing device applications 308 in one or more network types may comprise using at least one application programming interface 358 to adjust the bandwidth used by the one or more mobile computing device applications.

It is also contemplated that one embodiment of the invention comprises a non-transitory, tangible computer readable storage medium on a mobile computing device, encoded with processor readable instructions to perform a method of adjusting a monetary cost of one or more features on one or more mobile computing device applications. For example, the non-transitory, tangible computer readable storage medium may comprise at least a portion of the computer memory 106. Furthermore, as seen in FIG. 2, the method of adjusting a monetary cost of one or more features on one or more mobile computing device applications may comprise monitoring a bandwidth used 220 by the one or more mobile computing device applications 208. The user interface 212 may also display a real-time bandwidth or average bandwidth for each application 208 and/or application feature over a given period of time as set by the user or the system 368. In one embodiment, the user interface 212 may also display the monetary cost for the bandwidth used 220 by the one or more mobile computing device applications 208. The monetary cost may also be shown for the real-time bandwidth or average bandwidth. The mobile computing device user may use at least one of the bandwidth used 220 and the monetary cost to adjust the percentage of available bandwidth used by the one or more features of the one or more mobile computing device applications 208. The percentage of available bandwidth may comprise the throttle setting. The method may further comprise setting one or more network use policies for the one or more features of the one or more mobile computing device applications 208, and running a background service on the mobile computing device 100 to enforce the one or more network use policies. For example, the network user policies may comprise the one or more settings 216, and the background service may comprise the background agent 322, as seen in FIG. 3. In one embodiment, setting one or more network use policies for the one or more features of the one or more mobile computing device applications 208 comprises setting the one or more use policies through the user interface 212. Setting one or more network use policies for the one or more features of the one or more mobile computing device applications 208 may comprise one of, registering the one or more network use policies with one or more application programming interfaces 358, using the one or more applications 308 to query the one or more application programming interfaces 358, and adjusting an application behavior based on a query response from the application programming interface 358. For example, the one or more applications 308 may inquire as to the network type and receive a response that the network is a free WiFi network. The applications 308 may then initiate one or more various features such as, but not limited to, downloading attachments for an email application, given the response.

In conclusion, embodiments of the present invention enable modification of application features, dependent upon the network. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:
1. A mobile computing device comprising,
an application network use metric monitoring agent adapted to determine an amount a network metric is used by one or more mobile computing device applications, wherein the network metric comprises a real-time bandwidth data rate;

a network plan interface adapted to determine a monetary cost associated with the network metric used by the one or more mobile computing device applications;

a background agent comprising a background process adapted to regulate data sent to and from the one or more mobile computing device applications, the data being regulated dependent upon a percentage of the real-time bandwidth data rate being used by the one or more mobile computing device applications; and a user interface, wherein the user-interface, displays the monetary cost associated with the bandwidth data rate for the one or more mobile computing device applications; and provides one or more real-time adjustable bandwidth data rate usage settings for a plurality of features of the one or more mobile computing device applications, the one or more real-time adjustable bandwidth data rate usage settings relating to at least one of, the monetary cost associated with the bandwidth, and the percentage of the available bandwidth for the one or more networks.

2. The mobile computing device of claim 1 wherein the one or more mobile computing device applications comprises at least one of, a first application, wherein a functionality of the first application is dependent upon an amount of data remaining in a mobile computing device network data plan; and a second application whose functionality is adjusted by the user through the user interface.

3. The mobile computing device of claim 1 wherein the background agent is further adapted to, monitor incoming and outgoing network traffic for the one or more mobile computing device applications;

communicate with at least one of the application network use metric monitoring agent and the network plan interface; and enforce the one or more real-time adjustable bandwidth data rate usage settings for the one or more mobile computing device applications.

4. The mobile computing device of claim 1, wherein the one or more real-time adjustable bandwidth data rate usage settings comprises, one or more first settings, the one or more first settings being adapted to adjust a first application bandwidth data rate usage on one or more networks; and one or more second settings which enable and disable the one or more mobile computing device applications to access the one or more networks.

5. The mobile computing device of claim 4 wherein, the one or more second settings enable and disable the one or more mobile computing device applications by enabling and disabling one or more features of the one or more mobile computing device applications, the one or more features being enabled and disabled dependent upon, an available bandwidth data rate, and a bandwidth data rate amount used by the one or more features.

6. The mobile computing device of claim 5 wherein, the one or more first and second settings are adapted to be enabled and disabled through an application programming interface, the application programming interface adapted to at least one of, register the enabling and disabling of the one or more features of the one or more mobile computing device applications; and provide a response to a query from the one or more mobile computing device applications, wherein the response enables and the one or more mobile computing device applications to adjust the one or more features in accordance with the response.

7. The mobile computing device of claim 1 wherein, the one or more mobile computing device applications comprises a one of a first application and a second application;

the network plan interface determines that the mobile computing device is connected to a free network; and the background agent is adapted to enables data to be sent to and from the one of the first application and the second application.

8. The mobile computing device of claim 7 wherein, one of the application network use metric monitoring agent and the background agent is further adapted to determine the real-time bandwidth data rate of a plurality of individual features for each of the one or more mobile computing device applications, wherein, the real-time bandwidth data rate of a plurality of individual features is determined, for a specified time period, when the bandwidth changes, for a value of the change in bandwidth, and when the bandwidth reaches zero;

the one of a first application and a second application comprises an email application; and the free network comprises a home WiFi network.

9. A mobile computing system comprising, a real-time bandwidth data rate monitoring agent, wherein the real-time bandwidth data rate monitoring agent monitors network stack traffic associated with one or more mobile computing device applications;

a user interface, wherein the user interface is adapted to enable and disable a plurality of features on each of the one or more mobile computing device applications, the plurality of features being enabled and disabled dependent upon a monetary cost of the real-time bandwidth data rate associated with the a plurality of features;

a background service adapted to implement the at least one of enabling and disabling one or more features on the one or more mobile computing device applications;

a first application programming interface enabling and disabling at least one features on a first application of the one or more mobile computing device applications according to the monetary cost of the at least one feature, the first application being registered with the first application programming interface;

a second application programming interface providing at least one response to at least one query from a second application of the one or more mobile computing device applications, the second application enabling and disabling at least one feature of the second application according to the monetary cost of the at least one feature, upon receiving the at least one response; and a third application of the one or more mobile computing device applications comprising a plurality of features, each of the plurality of features being at least one of manually enabled and disabled according to the monetary cost of the plurality of features.

10. The mobile computing system of claim 9, wherein the user interface comprises, a first setting enabling a percentage of available the real-time bandwidth data rate to be used by at least one of the first application, second application, and third application; and a second setting disabling at least one of the first application, second application, and third application.

11. The mobile computing system of claim 9 wherein,
the at least one first application comprises an email application;
the one or more features on the at least one first application comprises,
a sync feature, and
an attachment download feature;
the first application programming interface limits the sync feature to a first percentage of the real-time bandwidth date rate; and
the second application programming interface limits the attachment download feature to a second percentage of a real-time bandwidth data rate.

12. The mobile computing system of claim 9 wherein,
the background service is,
initiated upon powering on of the mobile computing system, and
adapted to enable and disable one or more features on the one or more mobile computing device applications through a network stack;
at least one of the first application and second application comprises an application adapted to query one of the first application programming interface and the second application programming interface for a network data plan information;
the at least one of the first application programming interface and the second application programming interface provides the network data plan information to the at least one of the first application and second application; and
the service implements one of a first feature and a second feature on the at least one of the first application and second application in response to the network data plan information, the first feature using a greater network bandwidth than the second feature.

13. The mobile computing system of claim 12 wherein,
the user interface is further adapted to list each of the plurality of features for each or a plurality of networks; and
the network data plan information comprises,
an amount of data bytes remaining in a data plan associated with the mobile computing device, and
an end time of a current billing period associated with the data plan.

14. A method of controlling one or more mobile computing device applications comprising,
monitoring a bandwidth data rate used by the one or more mobile computing device applications;
calculating a monetary cost for the bandwidth data rate used by the one or more mobile computing device applications;
adjusting the bandwidth data rate used by the one or more mobile computing device applications by assigning a percentage of an available network capacity of the bandwidth data rate to each of one or more features on the one or more mobile computing device applications;
displaying the monetary cost associated with the bandwidth data rate for the one or more mobile computing device applications; and
providing one or more real-time adjustable bandwidth data rate usage settings for the each of the one or more features of the one or more mobile computing device applications, the one or more real-time adjustable bandwidth data rate usage settings relating to at least one of,
the monetary cost associated with the bandwidth, and
the percentage of the available bandwidth for the one or more networks.

15. The method of claim 14 wherein adjusting the bandwidth data rate used by the one or more mobile computing device applications comprises using a user interface to,
display the bandwidth data rate and the monetary cost, and
adjust the bandwidth data rate used and the monetary cost of at least one feature of the one or more mobile computing device applications.

16. The method of claim 15 wherein, adjusting the bandwidth data rate used and the monetary cost of at least one feature of the one or more mobile computing device applications comprises,
allowing the at least one feature to access one of a free network and an unlimited bandwidth network; and
allowing the at least one feature to access one of a cost-incurring network and a limited bandwidth network until a data threshold is obtained.

17. The method of claim 14 wherein adjusting the bandwidth data rate used by the one or more mobile computing device applications comprises using at least one application programming interface to adjust the percentage of an available network capacity of the bandwidth data rate used by the one or more features on the one or more mobile computing device applications.

18. A non-transitory, tangible computer readable storage medium on a mobile computing device, encoded with processor readable instructions to perform a method of adjusting a monetary cost of one or more features on one or more mobile computing device applications comprising,
monitoring a network use metric used by the one or more mobile computing device applications;
calculating a monetary cost for the network use metric used by the one or more mobile computing device applications; and
using at least one of the network use metric and the monetary cost to adjust the network use metric used by the one or more features on the one or more mobile computing device applications, wherein,
the network use metric comprises a bandwidth data rate, and
the at least one of the bandwidth data rate and the monetary cost is adjusted by assigning a percentage of an available network capacity of the bandwidth data rate to each of one or more features on the one or more mobile computing device applications
displaying the monetary cost associated with the bandwidth data rate for the one or more mobile computing device applications; and
providing one or more real-time adjustable bandwidth data rate usage settings for the each of the one or more features of the one or more mobile computing device applications, the one or more real-time adjustable bandwidth data rate usage settings relating to at least one of,
the monetary cost associated with the bandwidth, and
the percentage of the available bandwidth for the one or more networks.

19. The non-transitory, tangible computer readable storage medium of claim 18 wherein, the method further comprises,
setting one or more network use policies for the one or more features on the one or more mobile computing device applications; and
running a background service on the mobile computing device to enforce the one or more network use policies.

20. The non-transitory, tangible computer readable storage medium of claim 19 wherein, setting one or more network use policies for the one or more features on the one or more mobile computing device applications comprises setting the one or more use policies through a user interface.

21. The non-transitory, tangible computer readable storage medium of claim 18 wherein, assigning a percentage of an available network capacity of the bandwidth data rate to each of the one or more features on the one or more mobile computing device applications comprises one of,
- registering the one or more features with one or more application programming interfaces;
- query the one or more application programming interfaces; and
- adjusting an application behavior based on a query response.

* * * * *